UNITED STATES PATENT OFFICE.

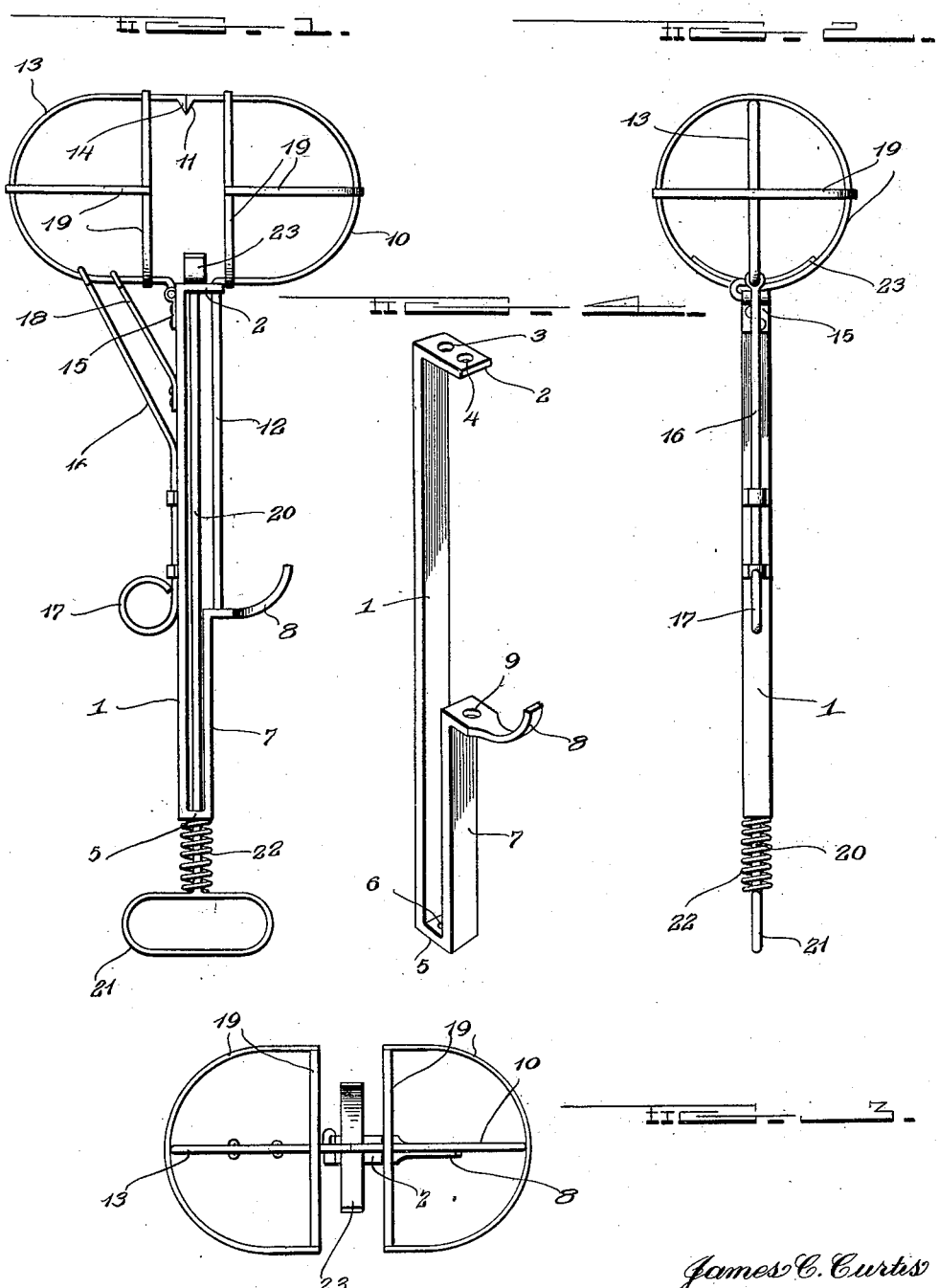

JAMES C. CURTIS, OF NEWCASTLE, CALIFORNIA.

EGG-OPENER.

1,369,625.   Specification of Letters Patent.   Patented Feb. 22, 1921.

Application filed June 28, 1920. Serial No. 392,145.

*To all whom it may concern:*

Be it known that I, JAMES C. CURTIS, a citizen of the United States, residing at Newcastle, in the county of Placer and State of California, have invented new and useful Improvements in Egg-Openers, of which the following is a specification.

The object of my present invention is the provision of a convenient device for opening and dropping eggs into hot grease or the like.

To the attainment of the foregoing the invention consists in the improvement as hereinafter described and definitely claimed.

In the accompanying drawings, hereby made a part hereof:—

Figure 1 is an elevation of one side of my novel egg opener.

Fig. 2 is an elevation taken at right angles to Fig. 1.

Fig. 3 is an end elevation of the device.

Fig. 4 is a perspective of the frame member of the device.

Similar numerals of reference designate corresponding parts in all of the views of the drawings.

Among other elements my novel device comprises a frame member 1 formed of sheet metal or other material suitable to its purpose. The said frame member includes a longitudinal bar of about the proportional length illustrated having at one end an angular arm 2 in which are apertures 3 and 4. The opposite end of the longitudinal bar is provided with a comparatively short arm 5 in which is an aperture 6. The arm 5, in turn, is merged into a comparatively short bar 7 that lies parallel to the main longitudinal bar and is provided at its free end with a lateral finger piece 8 in which is an aperture 9.

At 10 is the main jaw of the device. The said jaw 10 is provided at one end with a barb 11, and the other end of the jaw is merged into a shank 12 that is carried down through the aperture 4 in the frame and is fixedly connected to the finger piece 8 in the aperture 9 thereof.

In addition to the main jaw 10 the device includes a hinged jaw 13. The jaw 13 is provided at 14 with a barb, and is fastened to the frame through the medium of a small piece of metal 15, riveted to the frame. Connected with and adapted to coöperate with the jaw 13 is a draw bar 16 that is designed to open and close the jaw and is provided at 17 with the finger loop.

For the purpose of closing the hinged jaw 13 I provide the spring strip 18, and for the purpose of preventing eggs or shell portions from dropping from the jaws I provide the wire units 19, the said units 19 being arranged as illustrated relatively to the jaws 10 and 13.

Movable in the apertures 3 and 6 of the frame 1 is a push rod 20, having at 21 a handle or finger piece between which and the end of the frame is interposed a coil spring 22. At its end remote from the handle 21 the rod 20 is provided with a curvilinear follower 23 which is disposed above the frame arm 2 and is adapted to receive and conform to the cross section of an egg properly placed in the device.

In the practical operation of the device it will be apparent that when the rod 20 is moved endwise inwardly, the follower 23 will serve to press the egg against the barbs 11 and 14 with the result that the egg will be opened and the meat thereof dropped, and this without said meat coming into contact with the hands. It will also be observed that the swinging of the hinged jaw 13 through the medium of the rod 16 will assist materially in the opening of the egg. Then after the egg is dropped the device is turned about its axis whereupon the shell will fall from the jaws of the device, and the device will be ready for another operation.

Having described my invention, what I claim and desire to secure by Letters Patent, is:—

An egg opener comprising a frame member having apertured end portions and a comparatively short longitudinal bar and lateral finger piece thereon, egg holding jaws having barbs to open an egg, one of said jaws being hinged to the frame member and the other jaw having a shank fixed to one end portion and the finger piece of the frame member, a spring strip interposed between the hinged jaw and the frame member and fixed to the latter, a draw rod guided on the frame and connected to the hinged jaw, pressing rod guided at one side of the frame member, a pressing rod guided in the end portion of the frame member, a follower carried by the pressing rod and arranged to be opposed to the side of an egg, and a spring to retract the pressing rod.

In testimony whereof I affix my signature.

JAMES C. CURTIS.